United States Patent
Zhong et al.

(10) Patent No.: US 12,497,416 B2
(45) Date of Patent: Dec. 16, 2025

(54) ACYLPHOSPHINE OXIDE COMPOUNDS AND PREPARATION METHODS THEREOF

(71) Applicant: Anhui Chichem Corporation, Anhui (CN)

(72) Inventors: Xiaofeng Zhong, Anhui (CN); Jin Wu, Anhui (CN); Xiangjun Yue, Anhui (CN); Tienan Huang, Anhui (CN)

(73) Assignee: Anhui Chichem Corporation, Anqing (CN)

( * ) Notice: Subject to any disclaimer, the term of this patent is extended or adjusted under 35 U.S.C. 154(b) by 1228 days.

(21) Appl. No.: 17/311,649

(22) PCT Filed: Dec. 7, 2018

(86) PCT No.: PCT/CN2018/119922
§ 371 (c)(1),
(2) Date: Jun. 7, 2021

(87) PCT Pub. No.: WO2020/113585
PCT Pub. Date: Jun. 11, 2020

(65) Prior Publication Data
US 2022/0106340 A1    Apr. 7, 2022

(51) Int. Cl.
*C07F 9/50* (2006.01)
(52) U.S. Cl.
CPC ................... *C07F 9/5022* (2013.01)
(58) Field of Classification Search
USPC ......................................................... 568/17
See application file for complete search history.

(56) References Cited

U.S. PATENT DOCUMENTS

| | | | |
|---|---|---|---|
| 4,447,520 A | 5/1984 | Henne et al. | |
| 4,710,523 A | 12/1987 | Lechtken et al. | |
| 5,504,236 A | 4/1996 | Fischer et al. | |
| 2004/0204613 A1 | 10/2004 | Wolf et al. | |
| 2007/0290605 A1 | 12/2007 | Goto et al. | |

FOREIGN PATENT DOCUMENTS

| | | |
|---|---|---|
| CN | 103073658 A | 5/2013 |
| CN | 103333201 A | 10/2013 |
| CN | 103333206 A | 10/2013 |

(Continued)

OTHER PUBLICATIONS

Translation CN105198927, 2015.*

(Continued)

*Primary Examiner* — Ana Z Muresan
(74) *Attorney, Agent, or Firm* — Knobbe, Martens, Olson & Bear, LLP

(57) ABSTRACT

Disclosed are an acylphosphine oxide compound and a preparation method therefor, which belong to the field of initiators. The method comprises: reacting compound B and compound C under the conditions of an organic base and an organic solvent so as to obtain the acylphosphine oxide compound. The chemical structural formula of compound B is as follows:

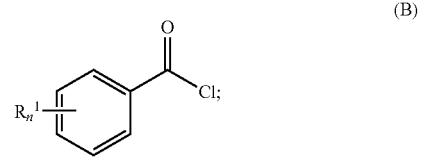

(B)

the chemical structural formula of compound C is as follows:

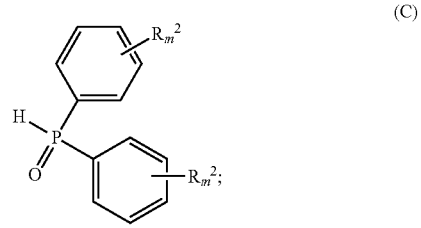

(C)

and the chemical structural formula of the acyl phosphine oxide compound is as follows:

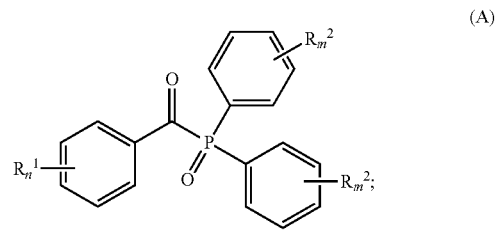

(A)

wherein $R^1$ is hydrogen, a $C_1$-$C_6$ alkyl group, methoxy, methylthio, dimethylamino, chloroformyl, phenyl, benzoyl, (4-dimethylamino) phenyl, α-naphthyl, β-naphthyl or (9-ethyl-9H-carbazole)-3-yl, $R^2$ and $R^1$ are the same, n is the substitution number of $R^1$ on the corresponding phenyl ring, and is 1, 2 or 3, and m is the substitution number of $R^2$ on the corresponding phenyl ring, and is 1, 2 or 3. The preparation method is safe and environmentally friendly, and has a high yield.

16 Claims, No Drawings

(56) References Cited

FOREIGN PATENT DOCUMENTS

| | | | |
|---|---|---|---|
| CN | 103880882 A | | 6/2014 |
| CN | 105198927 | * | 12/2015 |
| CN | 105238000 A | | 1/2016 |
| CN | 102875598 B | | 9/2016 |
| CN | 106083928 A | | 11/2016 |
| CN | 106496268 A | | 3/2017 |
| CN | 105198927 B | | 10/2017 |
| CN | 107304220 A | | 10/2017 |
| DE | 2830928 A1 | | 1/1980 |
| JP | S5877890 A | | 5/1983 |
| JP | 2005501124 A | | 1/2005 |
| WO | 0032612 A1 | | 6/2000 |
| WO | 2005104628 A1 | | 11/2005 |

OTHER PUBLICATIONS

International search report of PCT application No. PCT/CN2018/119922 issued on Sep. 27, 2019.
Decision of Refusal of Japanese application No. 2021-554784 issued on Jul. 4, 2023.
Rashid Nazir et al., Push-Pull Acylo-Phosphine Oxides for Two-Photon-Induced Polymerization, Macromolecules, vol. 46, No. 18, pp. 7239-7244, May 25, 2013, entire document.
Communication pursuant to Article 94(3) EPC of European application No. 18942325.4 issued on Sep. 15, 2023.
Communication pursuant to Article 94(3) EPC of European application No. 18942325.4 issued on Aug. 6, 2024.
Anonymous, "Phosphinous acid"—Wikipedia, Wikipedia, Apr. 29, 2023, pp. 1-2, Retrieved from the Internet: en.wikipedia.org/wiki/Phosphinous_acid [retrieved on Mar. 18, 2024].
Extended European search report of counterpart EP application No. 18942325.4 issued on Oct. 22, 2021.
Stankevic Marek et al., The Synthesis and Reactivity of Phosphinous Acid-Boranes; Synthesis, Jan. 1, 2005, pp. 1279-1290, entire document.
Examination report of counterpart Indian application No. 202127029665 issued on Oct. 25, 2021.
Notice of Reasons for Refusal of Japanese application No. 2021-554784 issued on Dec. 13, 2022.
Takaaki Yano et al., Synthetic Approach to Benzocyclobutenones Using Visible Light and a Phosphonate Auxiliary, Organic Letters, 2018, vol. 20, No. 4, pp. 1224-1227, entire document.
Communication pursuant to Article 94(3) EPC of European application No. 18942325.4 issued on Sep. 23, 2022.

* cited by examiner

ACYLPHOSPHINE OXIDE COMPOUNDS AND PREPARATION METHODS THEREOF

CROSS-REFERENCE TO RELATED APPLICATION

This application is a US national stage of international application No. PCT/CN2018/119922, filed on Dec. 7, 2018, the disclosure of which is herein incorporated by reference in its entirety.

TECHNICAL FIELD

The present disclosure relates to the field of initiator, in particular, relate to acylphosphine oxide compounds and preparation methods thereof.

BACKGROUND

Photoinitiator, also known as photosensitizer or photo-curing agent, is a kind of reagent which can cause chemical transformation after absorbing radiation energy, to generate activated intermediates that are capable of initiating polymerization. Among them, the acylphosphine oxide compounds are a kind of high efficient and widely used photoinitiators.

SUMMARY

Embodiments of the present disclosure provide acylphosphine oxide compounds and preparation methods thereof. The specific technical solutions are illustrated below:

In a first aspect, embodiments of the present disclosure provide a method for preparing an acylphosphine oxide compound, including:

reacting compound B with compound C in the presence of organic base and organic solvent to obtain the acylphosphine oxide compound, wherein, the chemical structural formula of the compound B is illustrated below:

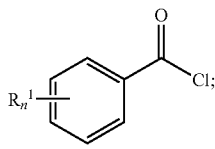

(B)

the chemical structural formula of the compound C is illustrated below:

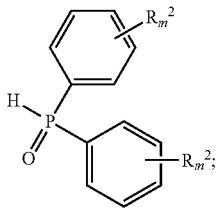

(C)

and
the chemical structural formula of the acylphosphine oxide compound is illustrated below:

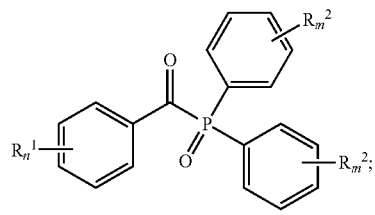

(A)

wherein, $R^1$ and $R^2$ are independently selected from the group consisting of hydrogen, $C_1$-$C_6$ alkyl, methoxy, methylthio, dimethylamino, chloroformyl, phenyl, benzoyl, (4-dimethylamine)phenyl, α-naphthyl, β-naphthyl and (9-ethyl-9H-carbazole)-3-yl;

n is the number of $R^1$ substituent(s) in relevant benzene ring, where n is 1, 2 or 3; and m is the number of $R^2$ substituent(s) in relevant benzene ring, where m is 1, 2 or 3.

In a possible design, the method further includes:
adding Lewis acid into the reaction system including the compound B and the compound C.

In a possible design, a molar ratio of the compound B, the compound C, the organic base and the Lewis acid is 1:1-2:1-5:0.01-2.

In a possible design, the Lewis acid is at least one selected from a group consisting of: chlorotrimethylsilane, bromotrimethylsilane, iodotrimethylsilane, chlorotriethylsilane, chlorotripropylsilane, tributylchlorosilane, tert-butyldimethylsilyl chloride, tert-butylchlorodiphenylsilane, chlorotrimethylsilane-sodium bromide, chlorotrimethylsilane-sodium iodide, trimethylsilyl methanesulfonate, tert-butyldimethylsilyl methanesulfonate, trimethylsilyl trifluoromethanesulfonate, or tert-butyldimethylsilyl trifluoromethanesulfonate.

In a possible design, the organic base is at least one selected from a group consisting of: triethylamine, tripropylamine, N,N-diisopropylethylamine, N,N-dimethylaniline, pyridine, 2,6-dimethylpyridine, 2-methylpyridine, 3-methylpyridine, or 4-methylpyridine.

In a possible design, the organic solvent is at least one selected from a group consisting of: toluene, xylene, tetrahydrofuran, 2-methyltetrahydrofuran, dioxane, ethylene glycol dimethyl ether, methyl tertiary butyl ether, dichloromethane, 1,2-dichloroethane, acetonitrile, N,N-dimethylformamide, N,N-dimethylacetamide, N-methylpyrrolidone, dimethyl sulfoxide, or sulfolane.

In a possible design, the reaction temperature of the compound B and the compound C ranges from −20° C. to 150° C., and the reaction time ranges from 1 h to 8 h.

In a possible design, reacting the compound B with the compound C under the organic solvent and the organic base includes:

obtaining a first mixture including the compound C and the organic solvent, then mixing the first mixture with the organic base in a first reactor; and adding the compound B into the first reactor, and reacting the compound B with the compound C.

In a possible design, adding the compound B into the first reactor includes:

obtaining a second mixture including the compound B and the organic solvent; and adding the second mixture dropwise into the first reactor.

In a possible design, obtaining the first mixture including the compound C and the organic solvent includes:

reacting a Grignard reagent with diethyl phosphite in the organic solvent, then quenching the reaction by acid solution as post-treatment procedure to obtain the first mixture including the compound C and the organic solvent, the Grignard reagent has the following chemical structural formula:

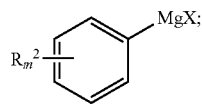

(D)

wherein, $R^2$ is selected from the group consisting of hydrogen, $C_1$-$C_6$ alkyl, methoxy, methylthio, dimethylamino, chloroformyl, phenyl, benzoyl, (4-dimethylamine)phenyl, α-naphthyl, β-naphthyl and (9-ethyl-9H-carbazole)-3-yl;

m is the number of $R^2$ substituent(s) in relevant benzene ring, where m is 1, 2 or 3;

X is chlorine, bromine or iodine.

In a possible design, a molar ratio of the diethyl phosphite to the Grignard reagent is 1:3-5.

In a possible design, the acid solution is at least one selected from a group consisting of: hydrochloric acid, hydrobromic acid, hydroiodic acid, sulfuric acid, acetic acid, oxalic acid, or citric acid solution.

In a possible design, the reaction temperature of the Grignard reagent and diethyl phosphite ranges from −20° C. to 150° C., and the reaction time ranges from 1 h to 4 h.

In a possible design, reacting the Grignard reagent with the diethyl phosphite in the organic solvent, then quenching the reaction by acid solution as post-treatment procedure, includes:

adding the diethyl phosphite into a second reactor containing a third mixture of the Grignard reagent and the organic solvent to react the Grignard reagent with the diethyl phosphite, then quenching the reaction by the acid solution as the post-treatment procedure.

In a possible design, the third mixture of the Grignard reagent and the organic solvent is prepared by the following method:

reacting magnesium powder with aryl halide in the presence of the organic solvent and an initiator to obtain the third mixture including the Grignard reagent and the organic solvent, the chemical structural formula of the aryl halide is illustrated below:

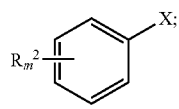

(E)

wherein, $R^2$ is selected from the group consisting of hydrogen, $C_1$-$C_6$ alkyl, methoxy, methylthio, dimethylamino, chloroformyl, phenyl, benzoyl, (4-dimethylamine)phenyl, α-naphthyl, β-naphthyl and (9-ethyl-9H-carbazole)-3-yl;

m is the number of $R^2$ substituent(s) in relevant benzene ring, where m is 1, 2 or 3;

X is chlorine, bromine or iodine.

In a possible design, a molar ratio of the aryl halide and the magnesium powder is 1:1-2.

In a possible design, the initiator is at least one selected from iodine or dibromoethane.

In a possible design, the reaction time of the magnesium powder and the aryl halide and ranges from 2 h to 4 h.

In another aspect, embodiments of the present disclosure provide an acylphosphine oxide compound of the following chemical structural formula:

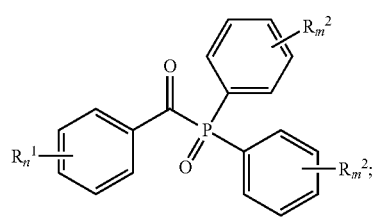

(A)

wherein, $R^1$ and $R^2$ are independently selected from the group consisting of hydrogen, $C_1$-$C_6$ alkyl, methoxy, methylthio, dimethylamino, chloroformyl, phenyl, benzoyl, (4-dimethylamine)phenyl, α-naphthyl, β-naphthyl and (9-ethyl-9H-carbazole)-3-yl;

n is the number of $R^1$ substituent(s) in relevant benzene ring, where n is 1, 2 or 3; and m is the number of $R^2$ substituent(s) in relevant benzene ring, where m is 1, 2 or 3.

DETAILED DESCRIPTION

To make the purpose, the technical solution and the advantages of the present disclosure clearer, the embodiments of the present disclosure will be described in further details with reference to the accompanying drawings.

The related art provides a type of acylphosphine oxide compound for commercial use, i.e., (2,4,6-trimethylbenzoyl) diphenylphosphine oxide (TPO), which has the following chemical structural formula:

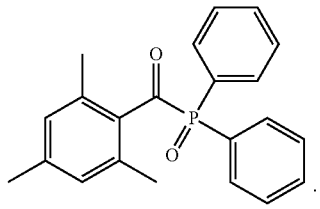

There are two main industrial methods for preparing TPO. In the first method, the TPO is obtained by subjecting chlorodiphenyl phosphine and methanol to esterification reaction under basic condition to produce a methyl diphenylphosphite intermediate, and then, subjecting the methyl diphenylphosphite intermediate and 2,4,6-trimethylbenzoyl chloride to a condensation reaction. In the second method, the TPO is obtained by hydrolyzing chlorodiphenyl phosphine to obtain diphenyl phosphine oxide, and then subjecting the diphenyl phosphine oxide and 2,4,6-trimethylbenzaldehyde to condensation reaction followed by an oxidization process. The method for preparing the chlorodiphenyl phosphine includes: reacting phosphorus trichloride and benzene under the catalytic action of aluminum trichloride, collecting the unreacted benzene and phosphorus trichloride as well as dichlorophenylphosphine through atmospheric distillation, then decomplexing the distillation residue with sodium chloride and collecting the chlorodiphenyl phosphine via distillation.

In the process of preparing the chlorodiphenyl phosphine, it is very likely to produce free phosphorus, which may arise potential safety hazard. Furthermore, the yield of chlorodiphenyl phosphine is low and industrial wastes such as hydrogen chloride and aluminium trichloride are readily generated from the preparing process, resulting in environmental pollutions. These issues existing in the production process of the chlorodiphenyl phosphine impose limitations on the production of TPO. In addition, in the second TPO preparation method, safety risks may also arise in the oxidation process.

In a first aspect, embodiments of the present disclosure provide a method for preparing an acylphosphine oxide compound, including:

reacting compound B with compound C in the presence of organic base and organic solvent to obtain the acylphosphine oxide compound, wherein, the chemical structural formula of the compound B is illustrated below:

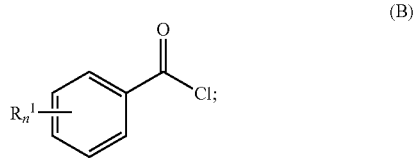

(B)

the chemical structural formula of the compound C is illustrated below:

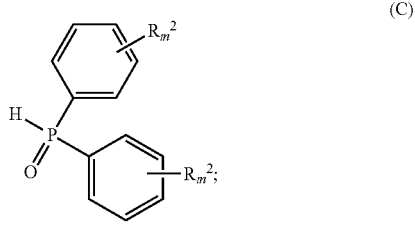

(C)

and the chemical structural formula of the acylphosphine oxide compound is illustrated below:

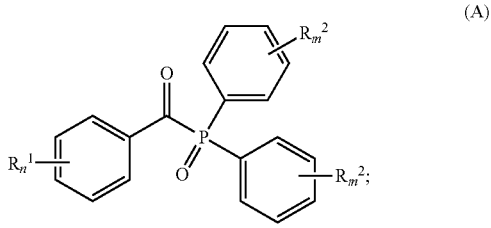

(A)

wherein, $R^1$ and $R^2$ are independently selected from the group consisting of hydrogen, $C_1$-$C_6$ alkyl, methoxy, methylthio, dimethylamino, chloroformyl, phenyl, benzoyl, (4-dimethylamine)phenyl, α-naphthyl, β-naphthyl and (9-ethyl-9H-carbazole)-3-yl;

n is the number of $R^1$ substituent(s) in relevant benzene ring, where n is 1, 2 or 3; and m is the number of $R^2$ substituent(s) in relevant benzene ring, where m is 1, 2 or 3.

It will be appreciated that, the position of $R^1$ on the relevant benzene ring is in an ortho-, meta-, or para-position relative to the acyl group, and the position of $R^2$ on the relevant benzene ring is in an ortho-, meta-, or para-position relative to the phosphinyl group.

In the embodiments of present disclosure, the acylphosphine oxide compounds can be used as a photoinitiator, which offers many advantages including high activity in polymerization initiation, high photo-curing speed, good thermal stability, low post-polymerization effect, free of residue and the like. Such compounds are applicable as ultraviolet curing coating material, printing ink material, ultraviolet curing adhesives, optical fiber coating material, photoresist material, photopolymerizable lithographic printing plate, a resin used for stereolithography, dental filling material, or the like.

In the embodiments of present disclosure, the amount of organic solvent as used is not specially limited, so long as it is sufficient to dissolve all the components and occur the reaction.

The chemical reaction of compound B with compound C is given by the following scheme:

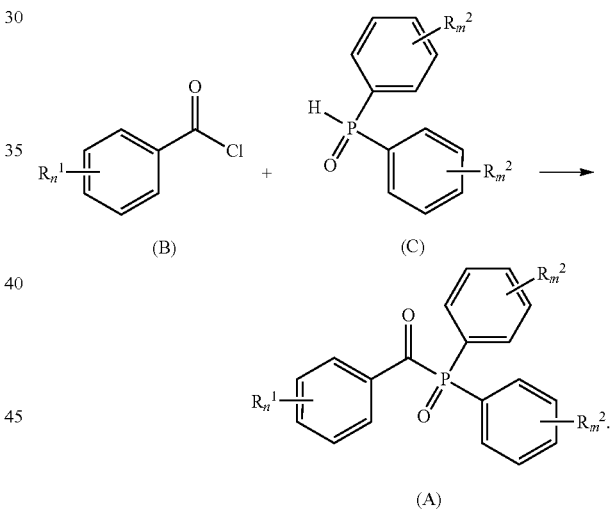

In the methods for preparing an acylphosphine oxide compound as provided in the embodiments of the present disclosure, compound B is reacted with compound C in the presence of organic base and organic solvent to obtain an acylphosphine oxide compound. These preparation methods do not use chlorodiphenyl phosphine as the raw material and do not involve an oxidation step. As such, the preparation methods are safe, environmentally friendly and easy to operate, and have a high yield or other features, which is beneficial to the production of acylphosphine oxide compounds. The acylphosphine oxide compounds prepared by the methods are stable in quality, high in purity, high in yield and low in cost, which is beneficial to industrial production.

The methods for preparing an acylphosphine oxide compound provided by the embodiments of the present disclosure may further include: adding Lewis acid into the reaction system including compound B and compound C.

It will be appreciated that, the reaction system including compound B and compound C may include: compound B, compound C, organic base and organic solvent.

By adding Lewis acid into the reaction system including compound B and compound C, the reaction between compound B and compound C for producing compound A can be facilitated and side reactions will be avoided.

The molar ratio of compound B/compound C/organic base/Lewis acid has a substantial influence on whether the acylphosphine oxide compounds can be efficiently prepared. Based on this fact, the molar ratio of compound B/compound C/organic base/Lewis acid may be 1:1-2:1-5:0.01-2, and the molar ratio of compound B/compound C/organic base/Lewis acid may further be 1:1:1-3:1.

For instance, the molar ratio of compound B/compound C/organic base/Lewis acid may be 1:1:1:0.01, 1:1.1:1.1:0.3, 1:1.4:2:0.5, 1:1.7:2.4:0.7, 1:1.8:3:0.9, 1:1:1:1, 1:1:2:1, 1:1:3:1, 1:1.9:4:1.5, 1:2:5:2 and so on.

In this way, the reaction between the compound B and compound C can proceed sufficiently and may have a fast reaction speed, which is beneficial to preparing acylphosphine oxide compounds in high efficiency and high yield.

As an example of the Lewis acid used in the embodiments of the present disclosure, the Lewis acid may be at least one selected from a group consisting of: chlorotrimethylsilane, bromotrimethylsilane, iodotrimethylsilane, chlorotriethylsilane, chlorotripropylsilane, tributylchlorosilane, tert-butyldimethylsilyl chloride, tert-butylchlorodiphenylsilane, chlorotrimethylsilane-sodium bromide, chlorotrimethylsilane-sodium iodide, trimethylsilyl methanesulfonate, tert-butyldimethylsilyl methanesulfonate, trimethylsilyl trifluoromethanesulfonate, or tert-butyldimethylsilyl trifluoromethanesulfonate.

Here, the Lewis acid may be any one, two, three, four, five, six, seven, . . . selected from the aforementioned types When the Lewis acid is a mixture, there is no specific limitation on the proportions of each components.

The aforementioned types of Lewis acids can effectively promote the reaction between compound B and compound C and have good miscibility with other components, and are low in cost and easy to obtain.

After adding the Lewis acid, the mixture can be stirred for 0.8-1.5 h, for example, for 0.8 h, 0.9 h, 1 h, 1.1 h, 1.2 h, 1.3 h, 1.4 h, or 1.5 h, etc.

In this way, the catalytic effect of the Lewis acid in promoting the reaction between compound B and compound C can be effectively guaranteed.

The organic base can absorb the hydrogen chloride generated from the reaction of compound B and compound C can the organic base would not incur any side reaction. As an example of the organic base used in the embodiments of the present disclosure, the organic base may be at least one selected from a group consisting of: triethylamine, tripropylamine, N,N-diisopropylethylamine, N,N-dimethylaniline, pyridine, 2,6-dimethylpyridine, 2-methylpyridine, 3-methylpyridine, or 4-methylpyridine.

Here, the organic base may be any one, two, three, four, five, six, seven . . . selected from the aforementioned types. When the organic base is a mixture, there is no specific limitation on the proportions of each components. For instance, when the organic base is a binary mixture of triethylamine and N,N-diisopropylethylamine, the weight ratio of the two components may be 1:1, 1:2, 1:3, 2:1, 2:3 and so on. When the organic base is a ternary mixture of triethylamine, N,N-diisopropylethylamine and N,N-dimethylaniline, the weight ratio of the three components may be 1:1:1, 1:2:1, 1:3:1, 2:1:1, 2:3:1, 2:2:1, 2:3:1, 2:1:3, 2:3:3 and so on.

The aforementioned types of organic bases not only can effectively promote the reaction of compound B and compound C to produce compound A, but also are low in cost and easy to obtain.

The organic solvents can make compound B and compound C be dispersed homogenously, which facilitate the uniform reaction between the two compounds. As an example of the organic solvent used in the embodiments of the present disclosure, the organic solvent may be at least one selected from a group consisting of: toluene, xylene, tetrahydrofuran, 2-methyltetrahydrofuran, dioxane, ethylene glycol dimethyl ether, methyl tertiary butyl ether, dichloromethane, 1,2-dichloroethane, acetonitrile, N,N-dimethylformamide, N,N-dimethylacetamide, N-methylpyrrolidone, dimethyl sulfoxide, or sulfolane.

Here, the organic solvent may be any one, two, three, four . . . or all selected from the aforementioned types. When the organic base is a mixture, there is no specific limitation on the proportion of each component. For instance, when the organic solvent is a binary mixture of toluene and tetrahydrofuran, the weight ratio of the toluene/tetrahydrofuran may be 1:1, 1:1.2, 1:1.4, 1:1.5, 1:1.7, 1:1.9, 1:2 and so on.

The aforementioned types of organic solvents can make compound B and compound C highly miscible, and are inexpensive and easy to obtain.

The reaction temperature of compound B and compound C may range from $-20°$ C. to $150°$ C., for example, may be $-20°$ C., $-10°$ C., $-5°$ C., $0°$ C., $10°$ C., $20°$ C., $30°$ C., $40°$ C., $50°$ C., $60°$ C., $70°$ C., $80°$ C., $90°$ C., $100°$ C., $110°$ C., $120°$ C., $130°$ C., $140°$ C., $150°$ C. and so on. The reaction time may range from 1 h to 8 h, for example, may be 1 h, 1.8 h, 1.9 h, 2 h, 2.1 h, 2.2 h, 2.3 h, 2.4 h, 2.5 h, 3 h, 3.5 h, 4 h, 4.5 h, 5 h, 5.5 h, 6 h, 6.5 h, 7 h, 7.5 h, 8 h and so on.

In this way, the reaction between the compound B and compound C can proceed sufficiently in the presence of the organic base and the organic solvent.

As to the method for mixing and reacting the compound B, compound C, organic base and organic solvent, the embodiments of present disclosure provide the following two examples:

(1) As a first example, the compound B, the compound C, the organic base and the organic solvent are all added into a first reactor, and then stirred for mixing to react.

(2) As a second example, the step of reacting compound B with compound C in the presence of the organic base and the organic solvent, includes:

step A, obtaining a first mixture including the compound C and the organic solvent, and then mixing the first mixture with the organic base in the first reactor.

Here, the first mixture including compound C and the organic solvent can be obtained by mixing the compound C with the organic solvent, or can be obtained through the following steps:

reacting the Grignard reagent with diethyl phosphite in the organic solvent, and then quenching the reaction by acid solution as post-treatment procedure to obtain the first mixture including the compound C and the organic solvent;

wherein the chemical structural formula of the Grignard reagent is illustrated below:

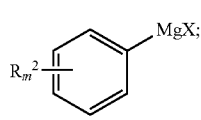

(D)

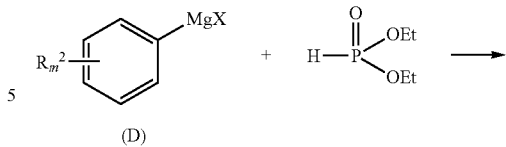

(D)

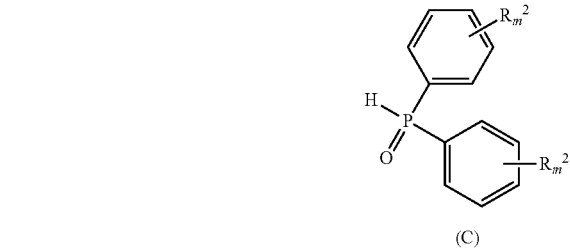

(C)

wherein, $R^2$ is selected from the group consisting of hydrogen, $C_1$-$C_6$ alkyl, methoxy, methylthio, dimethylamino, chloroformyl, phenyl, benzoyl, (4-dimethylamine)phenyl, α-naphthyl, β-naphthyl and (9-ethyl-9H-carbazole)-3-yl;

m is the number of $R^2$ substituent(s) in relevant benzene ring, where m is 1, 2 or 3; and X is chlorine, bromine or iodine.

In this way, acylphosphine oxide compounds can be prepared in high efficiency in absence of a compound C separation step.

The molar ratio of diethyl phosphite to the Grignard reagent has a substantial influence on whether the reaction can proceed sufficiently. Based on this fact, in the embodiments of present disclosure, the molar ratio of diethyl phosphite to the Grignard reagent may be 1:3-5, or the molar ratio of diethyl phosphite to the Grignard reagent may further be 1:3-3.5. For instance, the molar ratio of diethyl phosphite to the Grignard reagent may be 1:3, 1:3.1, 1:3.3, 1:3.5, 1:3.7, 1:3.9, 1:4, 1:4.1, 1:4.3, 1:4.5, 1:4.7, 1:4.9, 1:5 and so on.

The reaction temperature of the Grignard reagent and the diethyl phosphite may range from −20° C. to 150° C., for example, may be −20° C., −10° C., −5° C., 0° C., 10° C., 20° C., 30° C., 40° C., 50° C., 60° C., 70° C., 80° C., 90° C., 100° C., 110° C., 120° C., 130° C., 140° C., 150° C. and so on. The reaction time of the Grignard reagent and the diethyl phosphite may range from 1 h to 4 h, for example, may be 1 h, 1.5 h, 2 h, 2.5 h, 2.8 h, 2.9 h, 3 h, 3.1 h, 3.2 h, 3.3 h, 3.4 h, 3.5 h, 4 h and so on.

In this way, the combination of the molar ratio of the diethyl phosphite and the Grignard reagent the reaction temperature and reaction time can facilitate the sufficient reaction between the diethyl phosphite and the Grignard reagent.

By reacting the diethyl phosphite with the Grignard reagent in the organic solvent, and then quenching the reaction by acid solution as post-reaction procedure, the first mixture including the compound C and the organic solvent can be obtained in a high yield.

As an example, the acid solution may be at least one selected from a group consisting of: hydrochloric acid, hydrobromic acid, hydroiodic acid, sulfuric acid, acetic acid, oxalic acid, or citric acid solution.

Namely, the acid solution may be any one, one, two, three, four, five, six, seven selected from the aforementioned types. When the acid solution is a mixture, there is no specific limitation on the proportions of each components. For instance, when the acid solution is a binary mixture of acetic acid and citric acid solution, the molar ratio of acetic acid to citric acid may be 1:1, 1:2, 1:3, 2:1, 2:3 and so on.

These acid solutions as mentioned above are inexpensive, easy to obtain and also have a good quenching and hydration effect.

The acid solution may have a mass concentration ranging from 30% to 60%.

The chemical reaction between the diethyl phosphite and the Grignard reagent is given by the following scheme:

Step B includes adding compound B into the first reactor, and reacting the compound B with the compound C.

Adding the compound B into the first reactor includes, but is not limited to the following steps:

obtaining a second mixture including the compound B and the organic solvent; and adding the second mixture dropwise to the first reactor.

In this way, compound B and compound C can react both efficiently and sufficiently.

As to the method relating to the addition of the Grignard reagent and diethyl phosphite in step A, the embodiments of the present disclosure give the following examples.

Reacting the Grignard reagent with the diethyl phosphite in the organic solvent, and then quenching the reaction by acid solution as post-treatment procedure, includes: adding diethyl phosphite into the second reactor containing the third mixture of the Grignard reagent and the organic solvent, reacting the Grignard reagent with the diethyl phosphite, and then quenching reaction by acid solution as the post-treatment procedure.

Here, the third mixture of the Grignard reagent and the organic solvent can be prepared by directly mixing the Grignard reagent with the organic solvent, whereas the mixture can otherwise be prepared by the following method:

reacting magnesium powder with aryl halide in the presence of the organic solvent and an initiator, to obtain the third mixture including the Grignard reagent and the organic solvent.

The chemical structural formula of aryl halide is illustrated below:

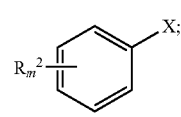

(E)

wherein, $R^2$ is selected from the group consisting of hydrogen, $C_1$-$C_6$ alkyl, methoxy, methylthio, dimethylamino, chloroformyl, phenyl, benzoyl, (4-dimethylamine)phenyl, α-naphthyl, β-naphthyl and (9-ethyl-9H-carbazole)-3-yl;

m is the number of $R^2$ substituent(s) in relevant benzene ring, where m is 1, 2 or 3; and X is chlorine, bromine or iodine.

In this way, acylphosphine oxide compounds can be efficiently prepared in absence of a Grignard reagent separation step.

The molar ratio of aryl halide to magnesium powder has a substantial influence on whether the two components can sufficiently react. Based on this fact, the molar ratio of aryl halide to magnesium powder may be 1:1-2, or the molar ratio of aryl halide to magnesium powder may be 1:1-1.2. For instance, the molar ratio of aryl halide to magnesium powder may be 1:1, 1:1.2, 1:1.4, 1:1.5, 1:1.7, 1:1.9, 1:2 and so on.

The initiator may be at least one selected from iodine and dibromoethane. In other words, the initiator is selected from iodine, dibromoethane or the mixture of iodine and dibromoethane.

The several aforementioned initiators have a good initiation effect to ensure that the aryl halide reacts sufficiently with the magnesium powder. In addition, the aforementioned initiators are inexpensive and easy to obtain.

As to the reaction between magnesium powder and aryl halide, the reaction time may range from 2 h to 4 h, for instance may be 2 h, 2.2 h, 2.5 h, 2.7 h, 2.8 h, 2.9 h, 3 h, 3.1 h, 3.2 h, 3.3 h, 3.4 h, 3.5 h, 3.7 h, 4 h and so on. In this way, it can ensure that aryl halide and magnesium powder react sufficiently in the presence of the initiator.

As to the mixing of the magnesium powder and the aryl halide, a mixture of the initiator, the aryl halide and the organic solvent may be firstly added dropwise into the second reactor, and then a mixture of the aryl halide and the organic solvent is added into the second reactor. By adding the reagents in two steps, the initiator can initiate the reaction between the magnesium powder and aryl halide, and subsequently, with the continuous addition of aryl halid, the reaction is allowed to continue. In this way, consumption of the initiator can be reduced.

The chemical reaction between aryl halide and magnesium powder is given by the following scheme:

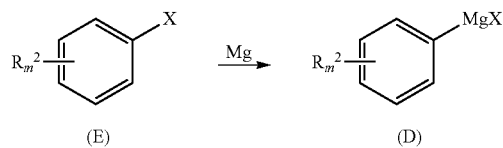

(E)     (D)

By adding diethyl phosphite dropwise into the second reactor, the diethyl phosphite can react with the Grignard reagent to obtain a reaction mixture; then the mixture is stirred for 1-4 h and then cooled to the room temperature. Subsequently, the reaction mixture is added dropwise to an acid solution for quenching reaction and finally the compound C is obtained.

In the embodiments of present disclosure, the room temperature may range from 20° C. to 30° C., for example, may be 20° C., 21° C., 22° C., 23° C., 24° C., 25° C., 26° C., 27° C., 28° C., 29° C., 30° C. and so on. Specific room temperature may be determined based on the actual operating environment.

In the embodiments of present disclosure, the first reactor and the second reactor can be the same reactor. When preparing the mixture of the compound C and the organic solvent, without isolating Grignard reagent and compound C respectively, but using the corresponding mixture of compound C and the organic solvent directly, the discharge of the intermediates can be avoided, which is suitable for industrial production.

After the reaction of compound B with compound C is sufficient, the acylphosphine oxide compound can be finally obtained via a washing process and a separation process.

Here, the washing process can remove impurities from the mixture by using the organic solvent or water as the detergent, while the separation process could be vacuum distillation, extraction and so on.

In the methods for preparing an acylphosphine oxide compound as provided in the embodiments of the present disclosure, compound B is reacted with compound C in the presence of organic base, organic solvent and Lewis acid to obtain an acylphosphine oxide compound. These preparation methods do not use chlorodiphenyl phosphine as the raw material and do not involve an oxidation step. As such, the preparation methods are safe, environmentally friendly and easy to operate, and have a high yield or other features, which is beneficial to the production of acylphosphine oxide compounds. The acylphosphine oxide compounds prepared by the methods are stable in quality, high in purity, high in yield and low in cost, which is beneficial to industrial production.

In another aspect, embodiments of the present disclosure provide an acylphosphine oxide compound, and the chemical structural formula thereof is illustrated below:

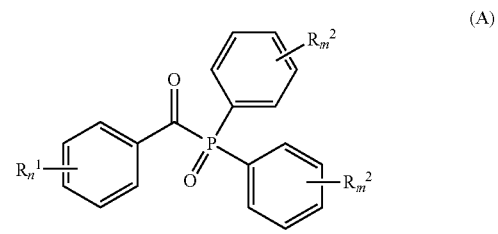

wherein, $R^1$ and $R^2$ are independently selected from the group consisting of hydrogen, $C_1$-$C_6$ alkyl, methoxy, methylthio, dimethylamino, chloroformyl, phenyl, benzoyl, (4-dimethylamine)phenyl, α-naphthyl, β-naphthyl and (9-ethyl-9H-carbazole)-3-yl;

n is the number of the $R^1$ substituent(s) in relevant benzene ring, where n is 1, 2 or 3; and m is the number of the $R^2$ substituent(s) in relevant benzene ring, where m is 1, 2 or 3;

The acylphosphine oxide compounds provided by the embodiments of present disclosure is obtained by reacting compound B with compound C under the presence of organic base and organic solvent. Such acylphosphine oxide compounds are stable in quality, high in purity, and high in photoinitiation activity, and can be widely used in industrial production.

In an example, (2,4,6-trimethylbenzoyl)diphenylphosphine oxide (TPO) of the following chemical structural formula was exemplarily provided:

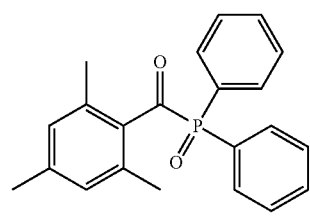

The compound TPO was prepared through the following method.

A mixture of 75 g magnesium powder and 500 ml tetrahydrofuran was placed in a flask under stirring and gentle reflux at 60° C. in absence of water and oxygen. Under stirring, a mixture of 5 g dibromoethane, 20 g chlorobenzene and 200 ml tetrahydrofuran was added into the flask dropwise with a dropping time of 1 hour, to initiate the reaction between magnesium powder and chlorobenzene. Subsequently, a mixture of 320 g chlorobenzene and 300 ml tetrahydrofuran was added into the flask dropwise with a dropping time of 3 hours. After the addition, the mixture was further stirred under gentle reflux for 3 hours, to obtain a mixture including Grignard reagent and tetrahydrofuran.

The temperature of the obtained mixture including the Grignard reagent and the tetrahydrofuran in the flask was kept between 40° C. to 50° C., and then under stirring, 138 g diethyl phosphite was added into the flask dropwise with a dropping time of 30 minutes. The mixture was further stirred under gentle reflux for 3 hours, and then cooled to the room temperature. Subsequently, 500 ml citric acid solution in a mass concentration of 50% was slowly added into the flask under stirring, and the mixture was further stirred for 30 minutes and then laid still for 30 minutes for layer separation. The organic phase was separated and concentrated under reduced pressure at a temperature between 40° C. to 50° C. to obtain the organic residue (containing diphenylphosphine oxide), and the tetrahydrofuran was recovered afterwards. The aqueous phase was mixed with 1 L toluene, stirred at room temperature for 30 minutes, and then laid still for 30 minutes for layer separation. Subsequently, the toluene phase was separated and combined with the previously-separated organic residue to obtain a mixture solution including the diphenylphosphine oxide (compound C) and impurities such as toluene, hydrogen chloride and so on. Then, the mixture as obtained was successively washed with 300 ml aqueous sodium bicarbonate solution in a mass concentration of 10% and 300 ml water, and then subjected to distillation under reduced pressure at a temperature between 50° C. to 60° C., to obtain approximate 400 ml toluene, with the remainder being a mixture of diphenylphosphine oxide and toluene.

The mixture of diphenylphosphine oxide and toluene as obtained was mixed with 220 g triethylamine in the flask at room temperature under stirring. A mixture of 105 g trimethylchlorosilane and 100 ml toluene was added dropwise into the flask at a temperature between 40° C. to 50° C., with a dropping time of 1 hour, followed by 1 hour of stirring. Afterwards a mixture of 185 g 2,4,6-trimethylbenzoyl chloride (compound B) and 200 ml toluene was added into the flask with a dropping time of 2 hours. Subsequently, the reaction mixture was stirred at 50° C. for 2 hours, then cooled to the room temperature.

The reaction mixture in the flask was washed twice at room temperature, each with 500 ml water. After the washing, the organic phase was separated and then subjected to distillation under reduced pressure at a temperature between 40° C. to 50° C. to remove the volatile compounds. Then 600 mL isopropyl ether was added into the organic phase, stirred and slurried for 2 hours at a temperature between 55° C. to 65° C. Subsequently the reaction mixture was stirred and slurried for another 1 hour at the temperature between 5° C. to 10° C., and then subjected to suction filtration to obtain a filter cake. Then the obtained filter cake was washed with cold isopropyl ester, followed by drying under reduced pressure at a temperature between 40° C. to 50° C. so as to obtain 324 g of TPO which was the target of this example, with a purity of 99.6% and a yield of 93% calculated based on diethyl phosphite.

In an example, a (2,4,6-trimethylbenzoyl) bis(p-tolyl) phosphine oxide of the following chemical structural formula was exemplarily provided:

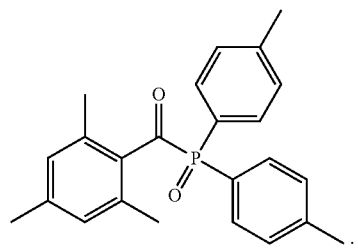

The compound (2,4,6-trimethylbenzoyl) bis(p-tolyl)phosphine oxide was prepared through the following method.

A mixture of 75 g magnesium powder and 500 ml tetrahydrofuran was placed in a flask under stirring and gentle reflux at 60° C. in absence of water and oxygen. Under stirring, a mixture of 5 g dibromoethane, 30 g p-chlorotoluene and 200 ml tetrahydrofuran was added into the flask dropwise with a dropping time of 1 hour, to initiate the reaction between magnesium powder and p-chlorotoluene. Subsequently, a mixture of 353 g p-chlorotoluene and 300 ml tetrahydrofuran was added into the flask dropwise with a dropping time of 3 hours. After the addition, the mixture was further stirred under gentle reflux for 3 hours, to obtain a mixture including Grignard reagent and tetrahydrofuran.

The temperature of the obtained mixture including the Grignard reagent and the tetrahydrofuran in the flask was kept between 40° C. to 50° C., and then under stirring, 138 g diethyl phosphite was added into the flask dropwise with a dropping time of 30 minutes. The mixture was further stirred under gentle reflux for 3 hours, and then cooled to the room temperature. Subsequently, 500 ml citric acid solution in a mass concentration of 50% was slowly added into the flask under stirring, and the mixture was further stirred for 30 minutes and then laid still for 30 minutes for layer separation. The organic phase was separated and concentrated under reduced pressure at a temperature between 40° C. to 50° C. to obtain the organic residue (containing bis(p-tolyl) phosphine oxide), and the tetrahydrofuran was recovered afterwards. The aqueous phase was mixed with 1 L toluene, stirred at room temperature for 30 minutes, and then laid still for 30 minutes for layer separation. Subsequently, the toluene phase was separated and combined with the previously separated organic residue to obtain a mixture solution including the bis(p-tolyl) phosphine oxide (compound C) and impurities such as toluene, hydrogen chloride and so on. Then, the mixture as obtained was successively washed with 300 ml aqueous sodium bicarbonate solution in a mass concentration of 10% and 300 ml water, and then subjected to distillation under reduced pressure at a temperature between 50° C. to 60° C., to obtain approximate 400 ml toluene, with the remainder being a mixture of bis(p-tolyl)phosphine oxide and toluene.

The mixture of bis(p-tolyl) phosphine oxide and toluene as obtained was mixed with 220 g triethylamine in the flask at room temperature under stirring. A mixture of 197 g iodotrimethylsilane and 100 ml toluene was added dropwise into the flask at a temperature between 40° C. to 50° C., with a dropping time of 1 hour, followed by 1 hour of stirring. Afterwards a mixture of 195 g 2,4,6-trimethylbenzoyl chloride (compound B) and 200 ml toluene was added into the flask with dropping a time of 2 hours. Subsequently, the reaction mixture was stirred at 50° C. for 2 hours, then cooled to the room temperature.

The reaction mixture in the flask was washed twice at room temperature, each with 500 ml water. After the washing, the organic phase was separated and then subjected to distillation under reduced pressure at a temperature between 40° C. to 50° C. to remove the volatile compounds. Then 600 mL isopropyl ether was added into the organic phase, stirred and slurried for 2 hours at a temperature between 55° C. to 65° C. Subsequently the reaction mixture was stirred and slurried for another 1 hour at the temperature between 5° C. to 10° C., and then subjected to suction filtration to obtain a filter cake. Then the obtained filter cake was washed with cold isopropyl ester, followed by drying under reduced pressure at a temperature between 40° C. to 50° C. so as to obtain 346 g of the (2,4,6-trimethylbenzoyl) bis(p-tolyl) phosphine oxide which was the target of this example, with a purity of 99.7% purity and a yield of 92% calculated based on diethyl phosphite.

In an example, a p-(dimethylamine)benzoyl diphenylphosphine oxide of the following chemical structural formula was exemplarily provided:

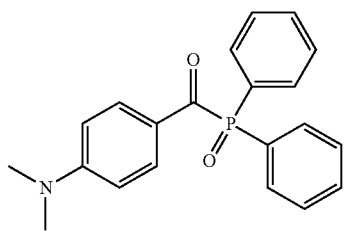

The compound p-(dimethylamine)benzoyl diphenylphosphine oxide was prepared by the following method:

A mixture of 75 g magnesium powder and 500 ml tetrahydrofuran was placed in a flask under stirring and gentle reflux at 60° C. in absence of water and oxygen. Under stirring, a mixture of 5 g dibromoethane, 20 g chlorobenzene and 200 ml tetrahydrofuran was added into the flask dropwise with a dropping time of 1 hour, to initiate the reaction between magnesium powder and chlorobenzene. Subsequently, a mixture of 320 g chlorobenzene and 300 ml tetrahydrofuran was added into the flask dropwise with a dropping time of 3 hours. After the addition, the mixture was further stirred under gentle reflux for 3 hours, to obtain a mixture including Grignard reagent and tetrahydrofuran.

The temperature of the obtained mixture including the Grignard reagent and the tetrahydrofuran in the flask was kept between 40° C. to 50° C., and then under stirring, 138 g diethyl phosphite was added into the flask dropwise with a dropping time of 30 minutes. The mixture was further stirred under gentle reflux for 3 hours, and then cooled to the room temperature. Subsequently, 500 ml citric acid solution in a mass concentration of 50% was slowly added into the flask under stirring, and the mixture was further stirred for 30 minutes and then laid still for 30 minutes for layer separation. The organic phase was separated and concentrated under reduced pressure at a temperature between 40° C. to 50° C. to obtain the organic residue (containing diphenylphosphine oxide), and the tetrahydrofuran was recovered afterwards. The aqueous phase was mixed with 1 L toluene, stirred at room temperature for 30 minutes, and then laid still for 30 minutes for layer separation. Subsequently, the toluene phase was separated and combined with the previously-separated organic residue to obtain a mixture solution including the diphenylphosphine oxide (compound C) and impurities such as toluene, hydrogen chloride and so on. Then, the mixture as obtained was successively washed with 300 ml aqueous sodium bicarbonate solution in a mass concentration of 10% and 300 ml water, and then subjected to distillation under reduced pressure at a temperature between 50° C. to 60° C., to obtain approximate 400 ml toluene, with the remainder being a mixture of diphenylphosphine oxide and toluene.

The mixture of diphenylphosphine oxide and toluene as obtained was mixed with 220 g triethylamine in the flask at room temperature under stirring. A mixture of 148 g trimethylbromosilane and 100 ml toluene was added dropwise into the flask at a temperature between 40° C. to 50° C., with a dropping time of 1 hour, followed by 1 hour of stirring. Afterwards a mixture of 176 g p-(dimethylamine)benzoyl chloride (compound B) and 200 ml toluene was added into the flask with a dropping time of 2 hours. Subsequently, the reaction mixture was stirred at 50° C. for 2 hours, then cooled to the room temperature.

The reaction mixture in the flask was washed twice at room temperature, each with 500 ml water. After the washing, the organic phase was separated and then subjected to distillation under reduced pressure at a temperature between 40° C. to 50° C. to remove the volatile compounds. Then 600 mL isopropyl ether was added into the organic phase, stirred and slurried for 2 hours at a temperature between 55° C. to 65° C. Subsequently the reaction mixture was stirred and slurried for another 1 hour at the temperature between 5° C. to 10° C., and then subjected to suction filtration to obtain a filter cake. Then the obtained filter cake was washed with cold isopropyl ester, followed by drying under reduced pressure at a temperature between 40° C. to 50° C. so as to obtain 318 g of p-(dimethylamine)benzoyl diphenylphosphine oxide which was the target of this example, with a purity of 99.6% and a yield of 91% calculated based on diethyl phosphite.

In an example, a p-(methoxy)benzoyl diphenylphosphine oxide of the following chemical structural formula was exemplarily provided:

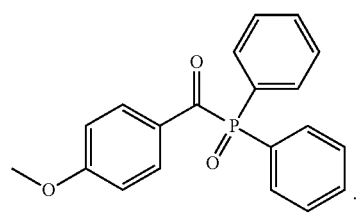

The compound p-(methoxy)benzoyl diphenylphosphine oxide was prepared the following method:

A mixture of 75 g magnesium powder and 500 ml tetrahydrofuran was placed in a flask under stirring and gentle reflux at 60° C. in absence of water and oxygen. Under stirring, a mixture of 5 g dibromoethane, 20 g chlorobenzene and 200 ml tetrahydrofuran was added into the flask dropwise with a dropping time of 1 hour, to initiate the reaction between magnesium powder and chlorobenzene. Subsequently, a mixture of 320 g chlorobenzene and 300 ml tetrahydrofuran was added into the flask dropwise with a dropping time of 3 hours. After the addition, the mixture was further stirred under gentle reflux for 3 hours, to obtain a mixture including Grignard reagent and tetrahydrofuran.

The temperature of the obtained mixture including the Grignard reagent and the tetrahydrofuran in the flask was kept between 40° C. to 50° C., and then under stirring, 138 g diethyl phosphite was added into the flask dropwise with a dropping time of 30 minutes. The mixture was further stirred under gentle reflux for 3 hours, and then cooled to the room temperature. Subsequently, 500 ml citric acid solution in a mass concentration of 50% was slowly added into the flask under stirring, and the mixture was further stirred for 30 minutes and then laid still for 30 minutes for layer separation. The organic phase was separated and concentrated under reduced pressure at a temperature between 40° C. to 50° C. to obtain the organic residue (containing diphenylphosphine oxide), and the tetrahydrofuran was recovered afterwards. The aqueous phase was mixed with 1 L toluene, stirred at room temperature for 30 minutes, and then laid still for 30 minutes for layer separation. Subsequently, the toluene phase was separated and combined with the previously-separated organic residue to obtain a mixture solution including the diphenylphosphine oxide (compound C) and impurities such as toluene, hydrogen chloride and so on. Then, the mixture as obtained was successively washed with 300 ml aqueous sodium bicarbonate solution in a mass concentration of 10% and 300 ml water, and then subjected to distillation under reduced pressure at a temperature between 50° C. to 60° C., to obtain approximate 400 ml toluene, with the remainder being a mixture of diphenylphosphine oxide and toluene.

The mixture of diphenylphosphine oxide and toluene as obtained was mixed with 220 g triethylamine in the flask at room temperature under stirring. A mixture of 105 g trimethylchlorosilane and 100 ml toluene was added dropwise into the flask at a temperature between 40° C. to 50° C., with a dropping time of 1 hour, followed by 1 hour of stirring. Afterwards a mixture of 164 g p-(methoxy)benzoyl chloride (compound B) and 200 ml toluene was added into the flask with a dropping time of 2 hours. Subsequently, the reaction mixture was stirred at 50° C. for 2 hours, then cooled to the room temperature.

The reaction mixture in the flask was washed twice at room temperature, each with 500 ml water. After the washing, the organic phase was separated and then subjected to distillation under reduced pressure at a temperature between 40° C. to 50° C. to remove the volatile compounds. Then 600 mL isopropyl ether was added into the organic phase, stirred and slurried for 2 hours at a temperature between 55° C. to 65° C. Subsequently the reaction mixture was stirred and slurried for another 1 hour at the temperature between 5° C. to 10° C., and then subjected to suction filtration to obtain a filter cake. Then the obtained filter cake was washed with cold isopropyl ester, followed by drying under reduced pressure at a temperature between 40° C. to 50° C. so as to obtain 309 g of p-(methoxy)benzoyl diphenylphosphine oxide which was the target of this example, with a purity of 99.8% and a yield of 92% calculated based on diethyl phosphite.

In an example, a p-(methylthio)benzoyl diphenylphosphine oxide of the following chemical structural formula was exemplarily provided:

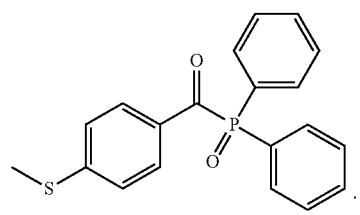 [SMILES: CSc1ccc(C(=O)P(=O)(c2ccccc2)c2ccccc2)cc1]

The compound p-(methylthio)benzoyl diphenylphosphine oxide was prepared through the following method:

A mixture of 75 g magnesium powder and 500 ml tetrahydrofuran was placed in a flask under stirring and gentle reflux at 60° C. in absence of water and oxygen. Under stirring, a mixture of 5 g dibromoethane, 20 g chlorobenzene and 200 ml tetrahydrofuran was added into the flask dropwise with a dropping time of 1 hour, to initiate the reaction between magnesium powder and chlorobenzene. Subsequently, a mixture of 320 g chlorobenzene and 300 ml tetrahydrofuran was added into the flask dropwise with a dropping time of 3 hours. After the addition, the mixture was further stirred under gentle reflux for 3 hours, to obtain a mixture including Grignard reagent and tetrahydrofuran.

The temperature of the obtained mixture including the Grignard reagent and the tetrahydrofuran in the flask was kept between 40° C. to 50° C., and then under stirring, 138 g diethyl phosphite was added into the flask dropwise with a dropping time of 30 minutes. The mixture was further stirred under gentle reflux for 3 hours, and then cooled to the room temperature. Subsequently, 500 ml citric acid solution in a mass concentration of 50% was slowly added into the flask under stirring, and the mixture was further stirred for 30 minutes and then laid still for 30 minutes for layer separation. The organic phase was separated and concentrated under reduced pressure at a temperature between 40° C. to 50° C. to obtain the organic residue (containing diphenylphosphine oxide), and the tetrahydrofuran was recovered afterwards. The aqueous phase was mixed with 1 L toluene, stirred at room temperature for 30 minutes, and then laid still for 30 minutes for layer separation. Subsequently, the toluene phase was separated and combined with the previously-separated organic residue to obtain a mixture solution including the diphenylphosphine oxide (compound C) and impurities such as toluene, hydrogen chloride and so on. Then, the mixture as obtained was successively washed with 300 ml aqueous sodium bicarbonate solution in a mass concentration of 10% and 300 ml water, and then subjected to distillation under reduced pressure at a temperature between 50° C. to 60° C., to obtain approximate 400 ml toluene, with the remainder being a mixture of diphenylphosphine oxide and toluene.

The mixture of diphenylphosphine oxide and toluene as obtained was mixed with 220 g triethylamine in the flask at room temperature under stirring. A mixture of 105 g trimethylchlorosilane and 100 ml toluene was added dropwise into the flask at a temperature between 40° C. to 50° C., with a dropping time of 1 hour, followed by 1 hour of stirring. Afterwards a mixture of 181 g p-(methylthio) benzoyl chloride (compound B) and 200 ml toluene was added into the flask with a dropping time of 2 hours. Subsequently, the reaction mixture was stirred at 50° C. for 2 hours, then cooled to the room temperature.

The reaction mixture in the flask was washed twice at room temperature, each with 500 ml water. After the washing, the organic phase was separated and then subjected to distillation under reduced pressure at a temperature between 40° C. to 50° C. to remove the volatile compounds. Then 600 mL isopropyl ether was added into the organic phase, stirred and slurried for 2 hours at a temperature between 55° C. to 65° C. Subsequently the reaction mixture was stirred and slurried for another 1 hour at the temperature between 5° C. to 10° C., and then subjected to suction filtration to obtain a filter cake. Then the obtained filter cake was washed with cold isopropyl ester, followed by drying under reduced pressure at a temperature between 40° C. to 50° C. so as to obtain 310 g of p-(methylthio)benzoyl diphenylphosphine oxide which was the target of this example, with a purity of 99.6% and a yield of 88% calculated based on diethyl phosphite.

In an example, p-(phenyl)benzoyl diphenylphosphine oxide of the following chemical structural formula was exemplarily provided:

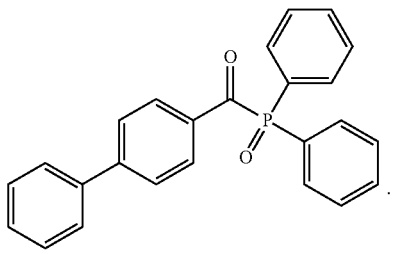 [SMILES: O=C(c1ccc(-c2ccccc2)cc1)P(=O)(c1ccccc1)c1ccccc1]

The compound p-(phenyl)benzoyl diphenylphosphine oxide was prepared through the following method.

A mixture of 75 g magnesium powder and 500 ml tetrahydrofuran was placed in a flask under stirring and gentle reflux at 60° C. in absence of water and oxygen. Under stirring, a mixture of 5 g dibromoethane, 20 g chlorobenzene and 200 ml tetrahydrofuran was added into the flask dropwise with a dropping time of 1 hour, to initiate the reaction between magnesium powder and chlorobenzene. Subsequently, a mixture of 320 g chlorobenzene and 300 ml tetrahydrofuran was added into the flask dropwise with a dropping time of 3 hours. After the addition, the mixture was further stirred under gentle reflux for 3 hours, to obtain a mixture including Grignard reagent and tetrahydrofuran.

The temperature of the obtained mixture including the Grignard reagent and the tetrahydrofuran in the flask was kept between 40° C. to 50° C., and then under stirring, 138 g diethyl phosphite was added into the flask dropwise with a dropping time of 30 minutes. The mixture was further stirred under gentle reflux for 3 hours, and then cooled to the room temperature. Subsequently, 500 ml citric acid solution in a mass concentration of 50% was slowly added into the flask under stirring, and the mixture was further stirred for 30 minutes and then laid still for 30 minutes for layer separation. The organic phase was separated and concentrated under reduced pressure at a temperature between 40° C. to 50° C. to obtain the organic residue (containing diphenylphosphine oxide), and the tetrahydrofuran was recovered afterwards. The aqueous phase was mixed with 1 L toluene, stirred at room temperature for 30 minutes, and then laid still for 30 minutes for layer separation. Subsequently, the toluene phase was separated and combined with the previously-separated organic residue to obtain a mixture solution including the diphenylphosphine oxide (compound C) and impurities such as toluene, hydrogen chloride and so on. Then, the mixture as obtained was successively washed with 300 ml aqueous sodium bicarbonate solution in a mass concentration of 10% and 300 ml water, and then subjected to distillation under reduced pressure at a temperature between 50° C. to 60° C., to obtain approximate 400 ml toluene, with the remainder being a mixture of diphenylphosphine oxide and toluene.

The mixture of diphenylphosphine oxide and toluene as obtained was mixed with 220 g triethylamine in the flask at room temperature under stirring. A mixture of 105 g trimethylchlorosilane and 100 ml toluene was added dropwise into the flask at a temperature between 40° C. to 50° C., with a dropping time of 1 hour, followed by 1 hour of stirring. Afterwards a mixture of 208 g p-(phenyl)benzoyl chloride (compound B) and 200 ml toluene was added into the flask with a dropping time of 2 hours. Subsequently, the reaction mixture was stirred at 50° C. for 2 hours, then cooled to the room temperature.

The reaction mixture in the flask was washed twice at room temperature, each with 500 ml water. After the washing, the organic phase was separated and then subjected to distillation under reduced pressure at a temperature between 40° C. to 50° C. to remove the volatile compounds. Then 600 mL isopropyl ether was added into the organic phase, stirred and slurried for 2 hours at a temperature between 55° C. to 65° C. Subsequently the reaction mixture was stirred and slurried for another 1 hour at the temperature between 5° C. to 10° C., and then subjected to suction filtration to obtain a filter cake. Then the obtained filter cake was washed with cold isopropyl ester, followed by drying under reduced pressure at a temperature between 40° C. to 50° C. so as to obtain 344 g of p-(phenyl)benzoyl diphenylphosphine oxide which was the target of this example, with a purity of 99.6% and a yield of 90% calculated based on diethyl phosphite.

In an example, terephthaloyl bis(diphenylphosphine oxide) of the following chemical structural formula was exemplarily provided:

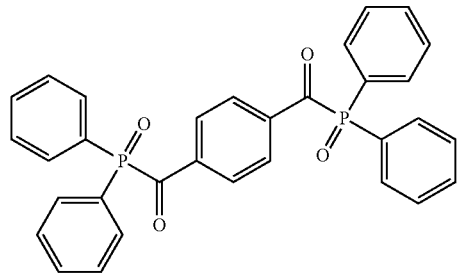

The compound terephthaloyl bis(diphenylphosphine oxide) was prepared through the following method.

A mixture of 75 g magnesium powder and 500 ml tetrahydrofuran was placed in a flask under stirring and gentle reflux at 60° C. in absence of water and oxygen. Under stirring, a mixture of 5 g dibromoethane, 20 g chlorobenzene and 200 ml tetrahydrofuran was added into the flask dropwise with a dropping time of 1 hour, to initiate the reaction between magnesium powder and chlorobenzene. Subsequently, a mixture of 320 g chlorobenzene and 300 ml tetrahydrofuran was added into the flask dropwise with a dropping time of 3 hours. After the addition, the mixture was further stirred under gentle reflux for 3 hours, to obtain a mixture including Grignard reagent and tetrahydrofuran.

The temperature of the obtained mixture including the Grignard reagent and the tetrahydrofuran in the flask was kept between 40° C. to 50° C., and then under stirring, 138 g diethyl phosphite was added into the flask dropwise with a dropping time of 30 minutes. The mixture was further stirred under gentle reflux for 3 hours, and then cooled to the room temperature. Subsequently, 500 ml citric acid solution in a mass concentration of 50% was slowly added into the flask under stirring, and the mixture was further stirred for 30 minutes and then laid still for 30 minutes for layer separation. The organic phase was separated and concentrated under reduced pressure at a temperature between 40° C. to 50° C. to obtain the organic residue (containing diphenylphosphine oxide), and the tetrahydrofuran was recovered afterwards. The aqueous phase was mixed with 1 L toluene, stirred at room temperature for 30 minutes, and then laid still for 30 minutes for layer separation. Subsequently, the toluene phase was separated and combined with the previously-separated organic residue to obtain a mixture solution including the diphenylphosphine oxide (compound C) and impurities such as toluene, hydrogen chloride and so on. Then, the mixture as obtained was successively washed with 300 ml aqueous sodium bicarbonate solution in a mass concentration of 10% and 300 ml water, and then subjected to distillation under reduced pressure at a temperature between 50° C. to 60° C., to obtain approximate 400 ml toluene, with the remainder being a mixture of diphenylphosphine oxide and toluene.

The mixture of diphenylphosphine oxide and toluene as obtained was mixed with 220 g triethylamine in the flask at room temperature under stirring. A mixture of 203 g trimethylsilyl trifluoromethanesulfonate and 100 ml toluene was added dropwise into the flask at a temperature between 40° C. to 50° C., with a dropping time of 1 hour, followed by 1 hour of stirring. Afterwards a mixture of 97 g terephthaloyl chloride (compound B) and 200 ml toluene was added into the flask with a dropping time of 2 hours. Subsequently, the reaction mixture was stirred at 50° C. for 2 hours, then cooled to the room temperature.

The reaction mixture in the flask was washed twice at room temperature, each with 500 ml water. After the washing, the organic phase was separated and then subjected to distillation under reduced pressure at a temperature between 40° C. to 50° C. to remove the volatile compounds. Then 600 mL isopropyl ether was added into the organic phase, stirred and slurried for 2 hours at a temperature between 55° C. to 65° C. Subsequently the reaction mixture was stirred and slurried for another 1 hour at the temperature between 5° C. to 10° C., and then subjected to suction filtration to obtain a filter cake. Then the obtained filter cake was washed with cold isopropyl ester, followed by drying under reduced pressure at a temperature between 40° C. to 50° C. so as to obtain 243 g of terephthaloyl bis(diphenylphosphine oxide) which was the target of this example, with a purity of 99.8% and a yield of 91% calculated based on diethyl phosphite.

In view of above, by using the methods for preparing acylphosphine oxide compounds provided by the embodiments of the present disclosure, the products as obtained are stable in quality, high in purity, and high in yield, which is beneficial to industrial production.

The above descriptions relate to only illustrative embodiments of the present disclosure and are not intended to limit the present disclosure. Any modification, equivalent, improvement etc. made within the spirit and principle of the present disclosure should be encompassed within the protection scope of the present disclosure.

What is claimed is:
1. A method for preparing an acylphosphine oxide compound, comprising:
reacting compound B with compound C in the presence of organic base and organic solvent in a reaction system to obtain the acylphosphine oxide compound,
and the method further comprises: adding a Lewis acid as a catalyst into the reaction system comprising the compound B and the compound C; wherein
a molar ratio of the compound B, the compound C, the organic base and the Lewis acid is 1:1-2:1-5:0.01-2;
a chemical structural formula of the compound B is illustrated below:

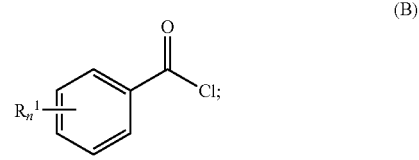

(B)

a chemical structural formula of the compound C is illustrated below:

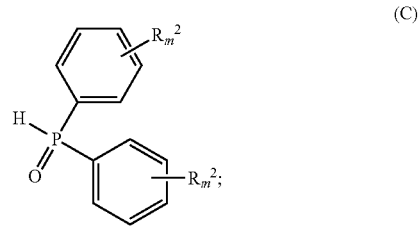

(C)

and
a chemical structural formula of the acylphosphine oxide compound is illustrated below:

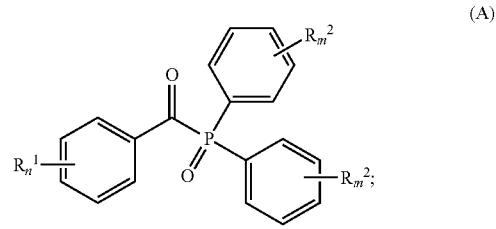

(A)

wherein, $R^1$ and $R^2$ are independently selected from the group consisting of hydrogen, $C_1$-$C_6$ methoxy, methylthio, dimethylamino, chloroformyl, phenyl, benzoyl, (4-alkyl, dimethylamine) phenyl, α-naphthyl, β-naphthyl and (9-ethyl-9H-carbazole)-3-yl;
n is the number of $R^1$ substituent(s) in relevant benzene ring, where n is 1, 2 or 3; and
m is the number of $R^2$ substituent(s) in relevant benzene ring, where m is 1, 2 or 3.

2. The method according to claim 1, wherein the Lewis acid is at least one selected from the group consisting of: chlorotrimethylsilane, bromotrimethylsilane, iodotrimethylsilane, chlorotriethylsilane, chlorotripropylsilane, tributylchlorosilane, tert-butyldimethylsilyl chloride, tert-butylchlorodiphenylsilane, chlorotrimethylsilane-sodium bromide, chlorotrimethylsilane-sodium iodide, trimethylsilyl methanesulfonate, tert-butyldimethylsilyl methanesulfonate, trimethylsilyl trifluoromethanesulfonate, and tert-butyldimethylsilyl trifluoromethanesulfonate.

3. The method according to claim 1, wherein the organic base is at least one selected from the group consisting of: triethylamine, tripropylamine, N,N-diisopropylethylamine, N,N-dimethylaniline, pyridine, 2,6-dimethylpyridine, 2-methylpyridine, 3-methylpyridine, and 4-methylpyridine.

4. The method according to claim 1, wherein the organic solvent is at least one selected from the group consisting of: toluene, xylene, tetrahydrofuran, 2-methyltetrahydrofuran, dioxane, ethylene glycol dimethyl ether, methyl tertiary butyl ether, dichloromethane, 1,2-dichloroethane, acetonitrile, N,N-dimethylformamide, N,N-dimethylacetamide, N-methylpyrrolidone, dimethyl sulfoxide, and sulfolane.

5. The method according to claim 1, wherein a reaction temperature of the compound B and the compound C ranges from −20° C. to 150° C., and a reaction time ranges from 1 h to 8 h.

6. The method according to claim 1, wherein reacting the compound B with the compound C in the presence of the organic solvent and the organic base comprises:
obtaining a first mixture comprising the compound C and the organic solvent, then mixing the first mixture with the organic base in a first reactor; and
adding the compound B into the first reactor, and reacting the compound B with the compound C.

7. The method according to claim 6, wherein adding the compound B into the first reactor comprises:
obtaining a second mixture comprising the compound B and the organic solvent; and
adding the second mixture dropwise into the first reactor.

8. The method according to claim 6, wherein obtaining the first mixture comprising the compound C and the organic solvent comprises:
reacting a Grignard reagent of a following chemical structural formula with diethyl phosphite in the organic solvent, then quenching the reaction by acid solution as post-treatment procedure to obtain the first mixture comprising the compound C and the organic solvent,

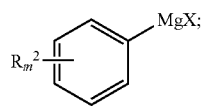

(D)

wherein, $R^2$ is selected from the group consisting of hydrogen, $C_1$-$C_6$ alkyl, methoxy, methylthio, dimethylamino, chloroformyl, phenyl, benzoyl, (4-dimethylamine) phenyl, α-naphthyl, β-naphthyl and (9-ethyl-9H-carbazole)-3-yl;
m is the number of $R^2$ substituent(s) in relevant benzene ring, where m is 1, 2 or 3;
X is chlorine, bromine or iodine.

9. The method according to claim 8, wherein a molar ratio of the diethyl phosphite to the Grignard reagent is 1:3-5.

10. The method according to claim 8, wherein the acid solution is at least one selected from the group consisting of: hydrochloric acid, hydrobromic acid, hydroiodic acid, sulfuric acid, acetic acid, oxalic acid, and citric acid solution.

11. The method according to claim 8, wherein the reaction temperature of the Grignard reagent and diethyl phosphite ranges from −20° C. to 150° C., and the reaction time ranges from 1 h to 4 h.

12. The method according to claim 8, wherein reacting the Grignard reagent with the diethyl phosphite in the organic solvent, then quenching the reaction by acid solution as post-treatment procedure, comprises:
adding the diethyl phosphite into a second reactor containing a third mixture of the Grignard reagent and the organic solvent to react the Grignard reagent with the diethyl phosphite, then quenching the reaction by the acid solution as the post-treatment procedure.

13. The method according to claim 12, wherein the third mixture of the Grignard reagent and the organic solvent is prepared by the following method:
reacting magnesium powder with aryl halide in the presence of the organic solvent and an initiator to obtain the third mixture comprising the Grignard reagent and the organic solvent,
a chemical structural formula of the aryl halide is illustrated below:

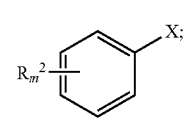

(E)

wherein, $R^2$ is selected from a group consisting of hydrogen, $C_1$-$C_6$ alkyl, methoxy, methylthio, dimethylamino, chloroformyl, phenyl, benzoyl, (4-dimethylamine) phenyl, α-naphthyl, β-naphthyl and (9-ethyl-9H-carbazole)-3-yl;
m is the number of $R^2$ substituent(s) in relevant benzene ring, where m is 1, 2 or 3;
X is chlorine, bromine or iodine.

14. The method according to claim 13, wherein a molar ratio of the aryl halide and the magnesium powder is 1:1-2.

15. The method according to claim 13, wherein the initiator is at least one selected from iodine or dibromoethane.

16. The method according to claim 13, wherein the reaction time of the magnesium powder and the aryl halide and ranges from 2 h to 4 h.

* * * * *